United States Patent
Sue et al.

(10) Patent No.: US 7,298,562 B2
(45) Date of Patent: Nov. 20, 2007

(54) LENS DRIVE UNIT

(75) Inventors: Takeshi Sue, Nagano (JP); Noboru Ootsuki, Nagano (JP)

(73) Assignee: Nidec Sankyo Corporation, Nagano (JP)

( * ) Notice: Subject to any disclaimer, the term of this patent is extended or adjusted under 35 U.S.C. 154(b) by 0 days.

(21) Appl. No.: 11/273,005

(22) Filed: Nov. 14, 2005

(65) Prior Publication Data

US 2007/0053082 A1    Mar. 8, 2007

(30) Foreign Application Priority Data

| | | |
|---|---|---|
| Sep. 2, 2005 | (JP) | ............... 2005-255040 |
| Oct. 28, 2005 | (JP) | ............... 2005-314565 |
| Mar. 22, 2006 | (JP) | ............... 2006-078343 |

(51) Int. Cl.
    *G02B 7/02*    (2006.01)

(52) U.S. Cl. ............... 359/819; 359/822; 359/823; 359/824

(58) Field of Classification Search ............... 359/819, 359/811, 813, 818, 815, 822, 824, 826, 821, 359/823, 44.15, 44.11, 44.14, 443.16; 369/44.15, 369/44.11; 44.14, 44.16
See application file for complete search history.

(56) References Cited

U.S. PATENT DOCUMENTS

2003/0012090 A1*    1/2003    Kawano ............... 369/44.16

* cited by examiner

*Primary Examiner*—Ricky Mack
*Assistant Examiner*—Brandi Thomas
(74) *Attorney, Agent, or Firm*—Reed Smith LLP

(57) ABSTRACT

Lens drive unit is provided with a moving lenticular body (sleeve 15, etc.) equipped with a lens, a driving mechanism to move the moving lenticular body in the optical axis direction of the lens and a fixed body (yoke 16, etc.) that supports the moving lenticular body so as to make it movable in the optical axis direction of the lens. The driving mechanism is provided with magnet 17 magnetized in the direction perpendicular to the optical axis direction of the lens, and multiple coils (first coil 14 and second coil 14') arranged so that the magnet is present in the optical axis direction of the lens. Either one of the magnet and the multiple coils is installed in the moving lenticular body, and the other in the fixed body. The driving mechanism is provided with a controlling element (flat spring 13, 13') to control the movement of the moving lenticular body caused by the electromagnetic force when a current is supplied to the multiple coils to generate the electromagnetic force, and magnetic member 30 is attracted to magnet 17 and is arranged on the opposite side of magnetic member 30 so as to sandwich one of the multiple coils between magnetic member 30 and magnet 17.

11 Claims, 8 Drawing Sheets

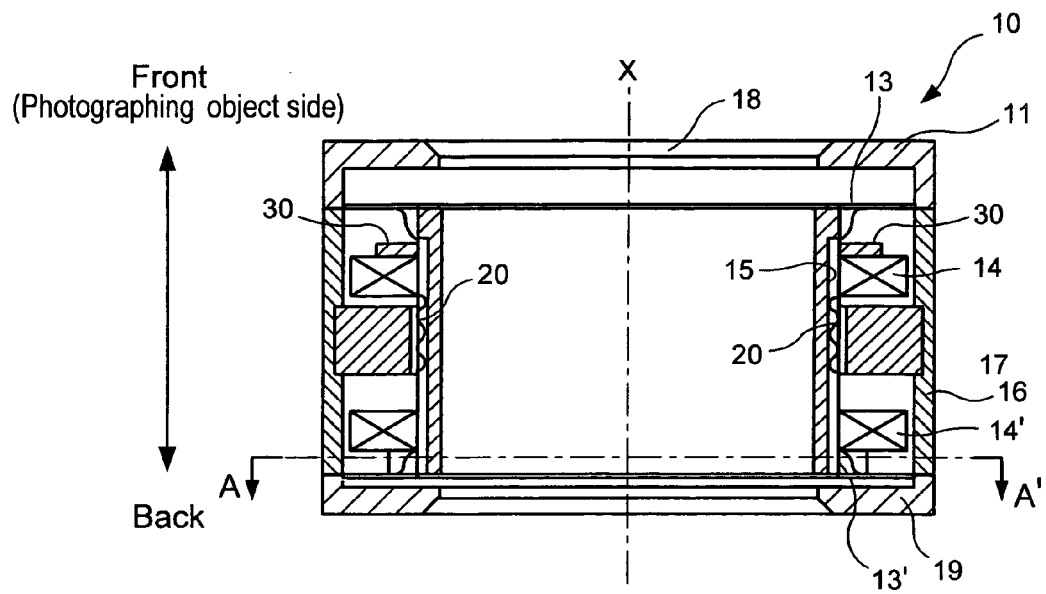
F I G. 1a
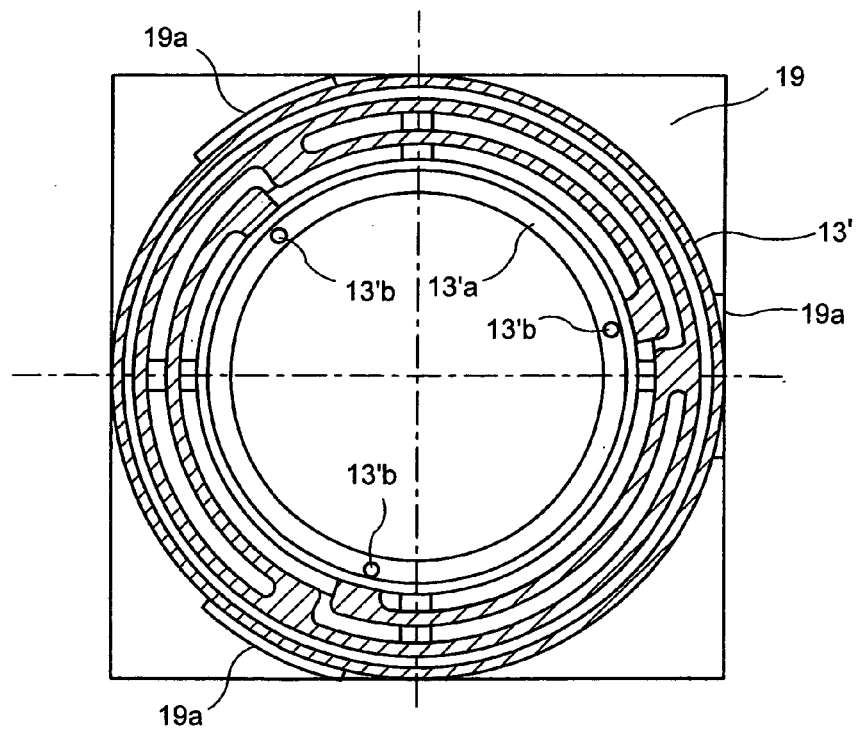
F I G. 1b

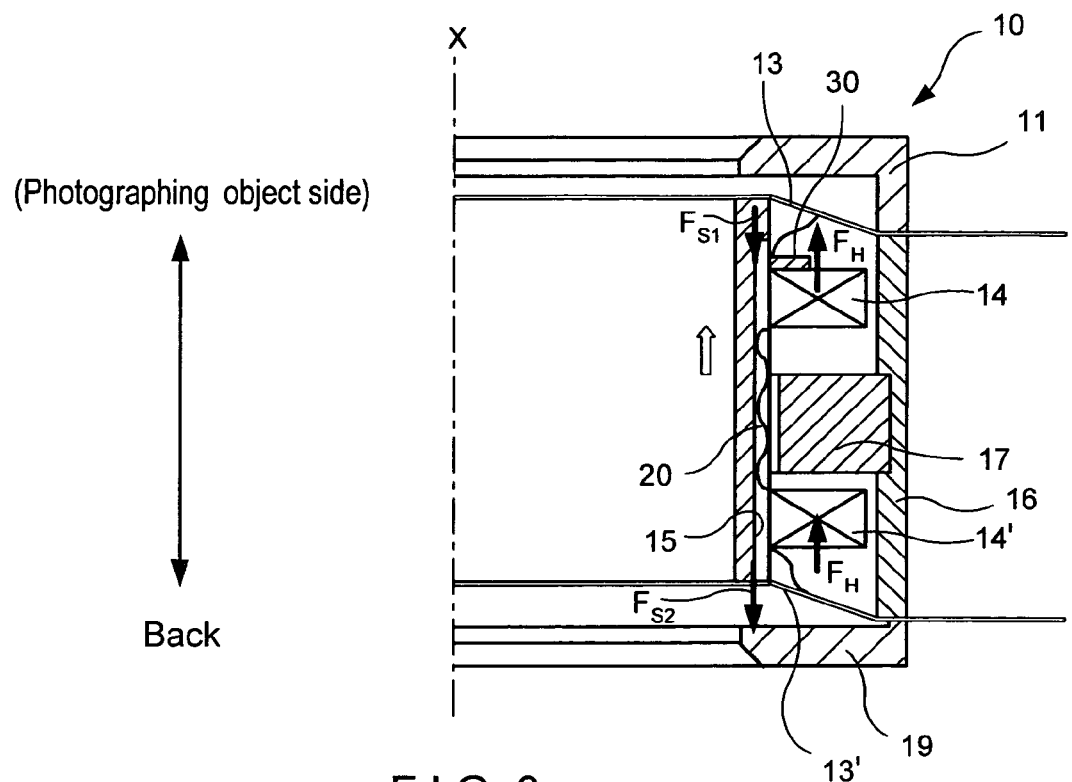
F I G. 3a
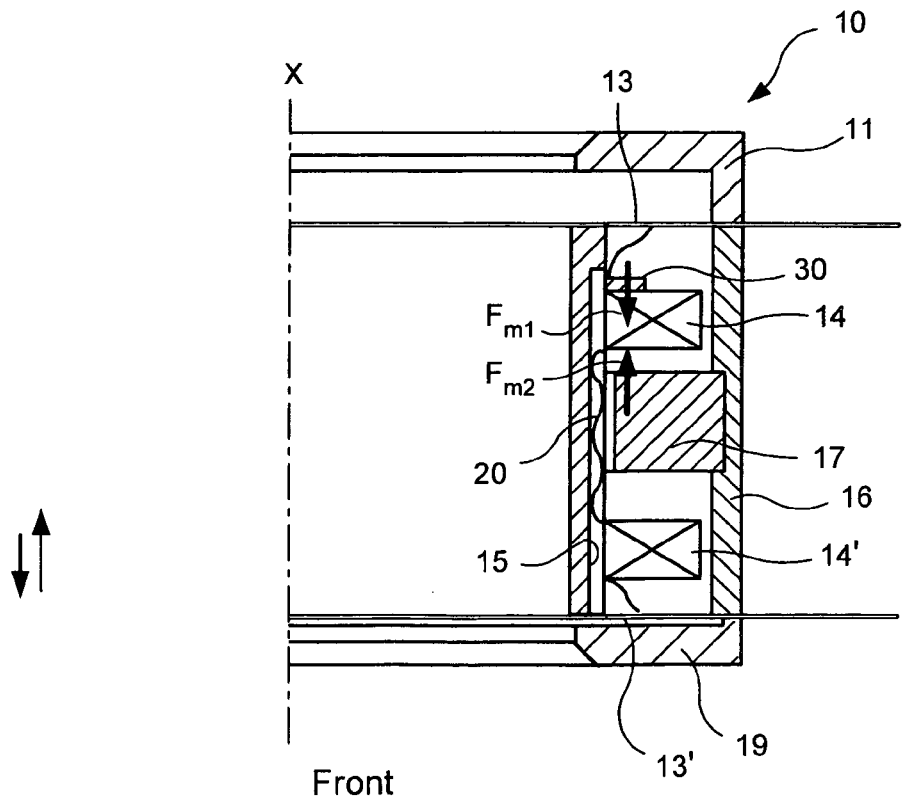
F I G. 3b

LENS DRIVE UNIT

FIELD OF THE INVENTION

The present invention relates to a lens drive unit which displaces and drives the lens in the optical axis direction to form the image of a subject.

BACKGROUND OF THE INVENTION

In recent years, as camera-attached cell phones to which cameras are mounted became widespread, photographing various subjects with the cell phones has been done with increasing frequency. For example, pictures of subjects separated from the camera lens at a certain degree, such as friends or landscapes, may be taken (regular photographing), or pictures of subjects positioned closely at the camera lens, such as bus schedules or petals, may be taken (tight close-up photographing).

In the case of tight close-up photographing (macro photographing), the camera lens must be placed at a position slightly closer to the subject side than the position of the lens during the ordinary photographing. Consequently, this type of photographing lens is equipped with a driving mechanism to displace and drive the lens in the optical axis direction, and this driving mechanism is driven by changing the switch so that the lens can be moved in the optical axis direction.

The lens drive unit disclosed in Japanese Kokai Patent 2005-37865 comprises a moving body equipped with a lens, and a fixed body which moves this moving body in the optical axis direction of the lens and, at the time, holds the moving body; a drive magnet is installed in the moving body and a drive coil and two yokes are installed in the fixed body. And, when energization of the drive coil is stopped, the magnetic adsorption between the drive magnet and the yoke is utilized to hold the moving body at a position close to any of the above-mentioned two yokes. Hence, this lens drive unit has such advantages as a simple construction, few parts and suitability for miniaturization.

The lens drive unit disclosed in Japanese Patent Application Publication 2005-128392 moves a lens support body along the optical axis direction of the lens by electromagnetic force generated by supplying a current to coils. And in the absence of an electric current supplied to coils, two springs energizes (presses) the lens support body against the base. Under this condition, when the camera is not in use, the lens support body is unlikely to experience shaking or loosening.

On the other hand, the lens drive unit disclosed in Japanese Patent Application Publication 2005-165058 moves a lens holder along the optical axis direction of the lens caused by means of the electromagnetic force when a current is supplied to coils. It comprises a holder contact section to control the motion of lens holder and a holder spring to energize the lens holder. The holder contact section controls the range within which the lens holder can move excluding the neutral position where the holder spring is in the neutral state. In this way, the holder spring constantly applies its force to the lens holder, thereby improving shock resistance.

However, since the lens drive unit disclosed in Japanese Patent Application Publication 2005-128392 and Japanese Patent Application Publication 2005-165058 holds the lens unit (the lens support component or the lens holder mentioned above) by relying on the energizing force of the spring as described above, unstabilizing alignment accuracy becomes unstable; this is a problem.

That is, generally strains or burrs occur in springs made by press processing, and variations in spring constants result in unstable alignment accuracy. On the contrary, springs made by etching can reduce variations in spring constants to a certain degree; however, this type provides poor productivity, thus increasing manufacturing costs.

The present invention was made in view of the above problems, and its objective is to provide a lens drive unit which can stabilize stationary position accuracy of the lens unit.

SUMMARY OF THE INVENTION

In order to solve the above problems, the present invention provides the following.

A lens drive unit characterized by the fact that it comprises a moving lenticular body equipped with a lens, a driving mechanism to move said moving lenticular body in the optical axis direction of the lens and a fixed body that supports said moving lenticular body so as to make it movable in the optical axis direction of the lens; said driving mechanism is provided with a magnet and multiple coils arranged so that said magnet is present in the optical axis direction of the lens; either one of said magnet and said multiple coils is installed in said moving lenticular body, and the other in said fixed body; wherein said driving mechanism also comprises a controlling means to control the movement of said moving lenticular body caused by the electromagnetic force when a current is supplied to said multiple coils to generate said electromagnetic force, and a magnetic member arranged on the opposite side of said magnet to be attracted to said magnet while sandwiching one of said multiple coils between said magnetic member and said magnet.

According to the present invention, the lens drive unit comprises a moving lenticular body equipped with a lens, a driving mechanism to move the moving lenticular body with a magnet and multiple coils, and a fixed body that supports the moving lenticular body. Either one of the magnet and the multiple coils is installed in the moving lenticular body; the other in the fixed body. The driving mechanism also comprises a controlling means to control the movement of the moving lenticular body caused by the electromagnetic force, and a magnetic member arranged on the opposite side of the magnet to be attracted to the magnet while sandwiching one of the multiple coils. Thus, the magnetic attraction acts between the magnetic member and the magnet via coils.

As a result, during macro photographing, for example, the moving lenticular body is held at an appropriate position by the balance between the electromagnetic force generated by multiple coils and the controlling force caused by the controlling means. On the other hand, during normal photographing (or a camera is not in use), for example, the moving lenticular body can be held by the magnetic attraction acting between a magnetic member and a magnet. Unlike the conventional lens drive unit mentioned above, the present invention in particular holds a moving lenticular body without relying on the energizing force of a spring but by relying on the highly stable magnetic attraction. In this way, the stationary position accuracy of a moving lenticular body varies less and stabilized. In addition, since there is no need for manufacturing the spring for holding a moving lenticular body; this contributes a reduction in manufacturing costs.

Here, the meaning of "control means" used in the present invention is a means to generate a force in the direction opposite to the direction of the moving lenticular body movement; it is preferable that the force vary in accordance with the amount of the moving lenticular body movement. For example, it may be a flat spring, coil spring, magnet spring or an elastic member such as rubber or the like. Moreover, it may be a substance in which a magnet of the N pole (S pole) is set up in the fixed body, a magnet of the N pole (S pole) is set up in the moving lenticular body, and both magnetic repulsive forces are utilized. It does not matter what the type is.

Moreover, the "magnetic member" as defined in the present invention may be any member that generates some degree of magnetic attraction in the presence of a magnet. For example, even if a member is generally known for its non-magnetic characteristic, it may be included in the "magnetic member" as long as a small degree of magnetic attraction occurs in the presence of a magnet. Moreover, there is no restriction with respect to the shape, type, and size of the "magnetic member".

The lens drive unit as set forth in characterized by the fact that said magnetic member has a circular shape and is arranged along the same axis as the optical axis of the lens.

According to the present invention, since the magnetic component mentioned above is formed in a circular shape and arranged along the same axis as the optical axis of the lens, the magnetic attraction can be generated between the magnetic member and the magnet stably, thus stabilizing the stationary position accuracy of the moving lenticular body.

In other words, for example, in the case in which small pieces of magnetic members are spread along the circumferential direction of a coil, a certain spacing arrangement causes magnetic attractions acting between magnetic members and the magnet to vary; this affects stabilization of stationary position accuracy of the moving lenticular body. However, according to the present invention, circular magnetic members are arranged along the same axis as the optical axis of the lens in the present invention; as a result, the magnetic attractions do not vary between the magnetic members and a magnet. Hence, it is possible to generate magnetic attraction stably at all points along the circumferential direction of the coil, thereby stabilizing the stationary position accuracy of a moving lenticular body.

The lens drive unit can also be provided with a magnetic member that is arranged on the opposite side of said magnet in such a manner that, among said multiple coils, the coil on the subject side is sandwiched between said magnetic member and said magnet.

According to the present invention, the above mentioned magnetic member is arranged on the opposite side of the magnet while sandwiching one of the multiple coils on the subject side (Namely, this is the coil on the side toward which the moving lenticular body moves during macro photographing) between the magnetic member and the magnet. As a result, during normal photographing (or when the camera is not in use), the moving lenticular body can be held by the magnetic attraction acting between the magnetic member and the magnet, thereby stabilizing stationary position accuracy of the moving lenticular body.

A lens drive unit characterized by the fact that it comprises a moving lenticular body equipped with a lens, a driving mechanism to move said moving lenticular body in the optical axis direction of the lens and a fixed body that supports said moving lenticular body so as to make it movable in the optical axis direction of the lens; said driving mechanism is provided with a magnet and multiple coils arranged so that said magnet is present in the optical axis direction of the lens; either one of said magnet and said multiple coils is installed in said moving lenticular body, and the other in said fixed body; and said driving mechanism is provided with a controlling means to control the movement of said moving lenticular body caused by the electromagnetic force when a current is supplied to said multiple coils to generate said electromagnetic force and, at the same time, said controlling means is a member to be magnetically attracted to said magnet.

According to the present invention, the lens drive unit comprises a moving lenticular body equipped with a lens, a driving mechanism to move the moving lenticular body with a magnet and multiple coils, and a fixed body that supports the moving lenticular body so as to make it movable in the optical axis direction of the lens. either one of the magnet and the multiple coils is installed in the moving lenticular body, and the other in the fixed body; and the driving mechanism is provided with a controlling means to control the movement of the moving lenticular body caused by the electromagnetic force and is attracted to the magnet. As a result, magnetic attractions act between the controlling means and the magnet via coils.

Accordingly, during normal photographing (or when the camera is not in use), for example, a moving lenticular body can be held without relying on the energizing force of a spring but by relying on the highly stable magnetic attraction. As a result, the stationary position accuracy of a moving lenticular body varies less, and what is more, it can be stabilized.

(5) The lens drive unit as set forth in (4) characterized by that said controlling means comprises a first elastic member to energize said moving lenticular body in one of the optical axis directions, a second elastic member to energize in the opposite direction of said first direction wherein either said first elastic member or said second elastic member is the member to be electromagnetically attracted to the magnet.

According to the present invention, the above-mentioned controlling means comprises a first elastic member to energize the moving lenticular body in one of the optical axis directions of the lens and a second elastic member to energize the moving lenticular body in the direction opposite to the above such that one of the elastic members can be magnetically attracted to a magnet. As a result, the magnetic attraction acts, for example, between the first elastic member and the magnet.

Therefore, between the first elastic member and the second elastic member (for example, the first elastic member), by making the elastic member on the subject side attracted to the magnet, the moving lenticular body can be held by relying on the highly stable magnetic attraction during normal photographing (or when the camera is not in use). As a result, the stationary position accuracy of the moving lenticular body varies less, and what is more, it can be stabilized.

According to the lens drive unit associated with the present invention, for example, during normal photographing (or the camera is not in use), the moving lenticular body can be held by relying on the highly stable magnetic attraction. As a result, the stationary position accuracy of the moving lenticular body varies less, and what is more, it can be stabilized.

BRIEF DESCRIPTION OF THE DRAWINGS

FIG. 1 illustrates a cross section of the lens drive unit of one embodiment of the present invention;

DETAILED DESCRIPTION OF THE DRAWINGS

Figure 2:
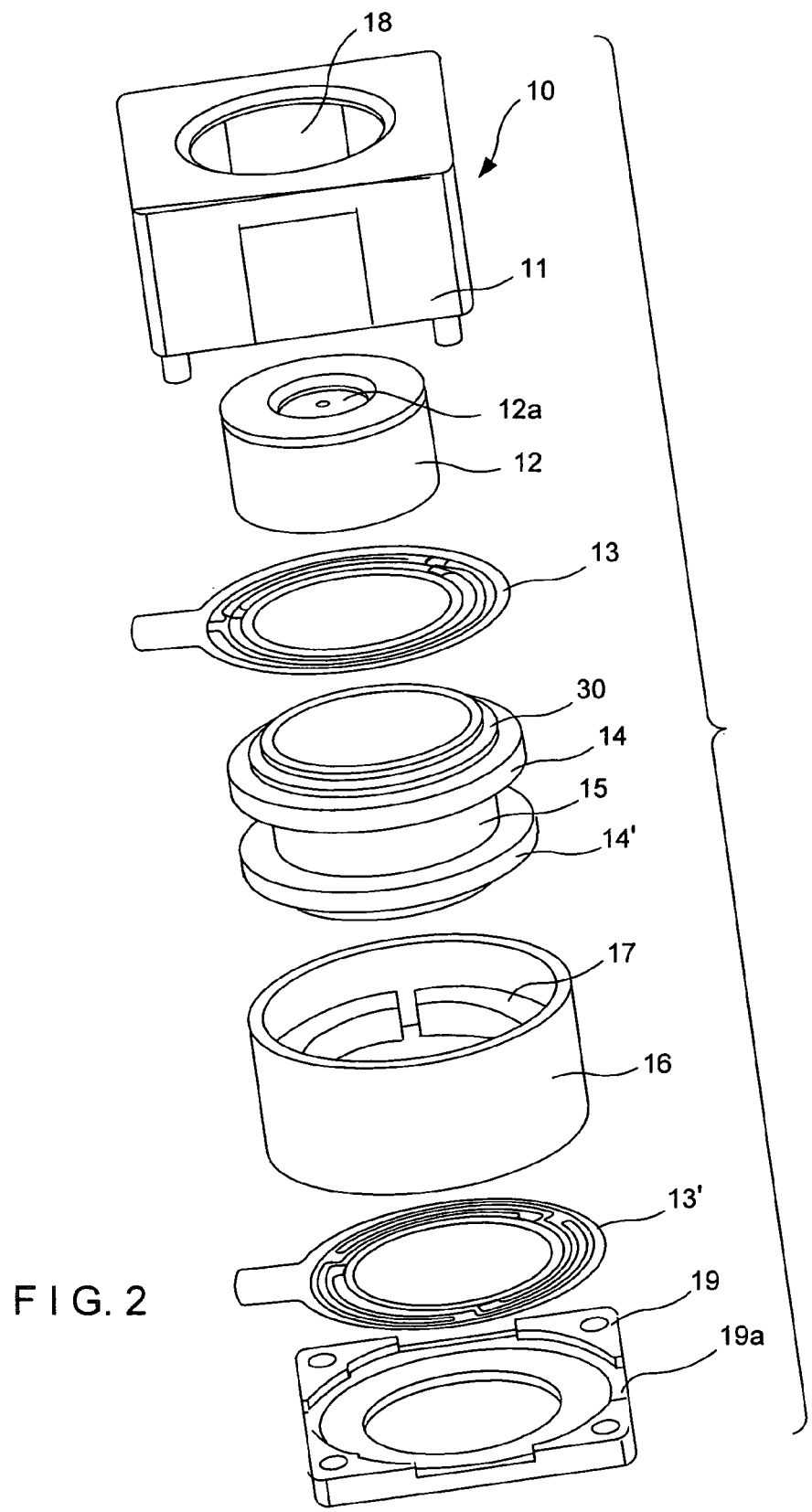
FIG. 2 is a three-dimensional view of the assembly of the lens drive unit in one embodiment of the present invention.
Figure 3C:
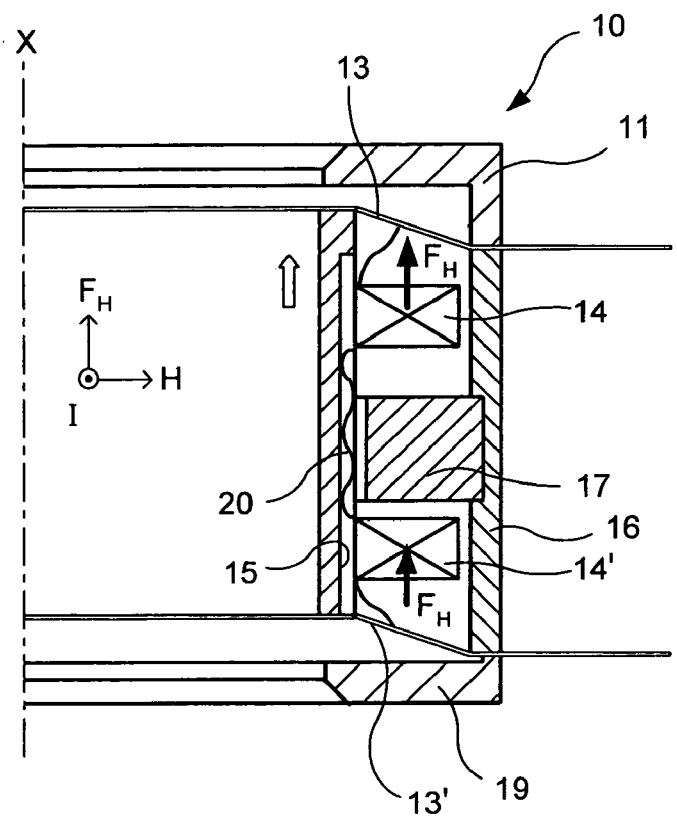
FIG. 3 illustrates the state in which a sleeve is held in a lens drive unit.
Figure 3D:
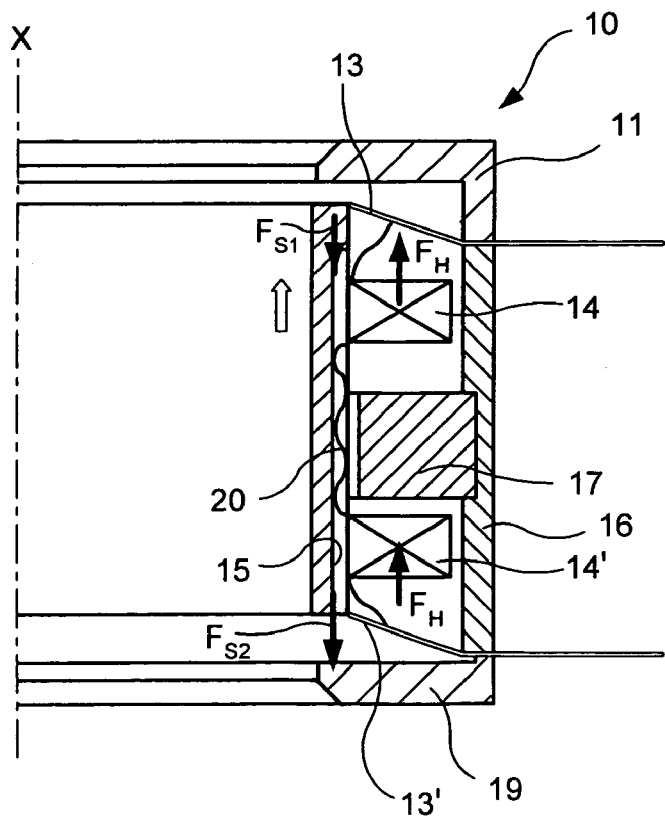
Figure 3E:
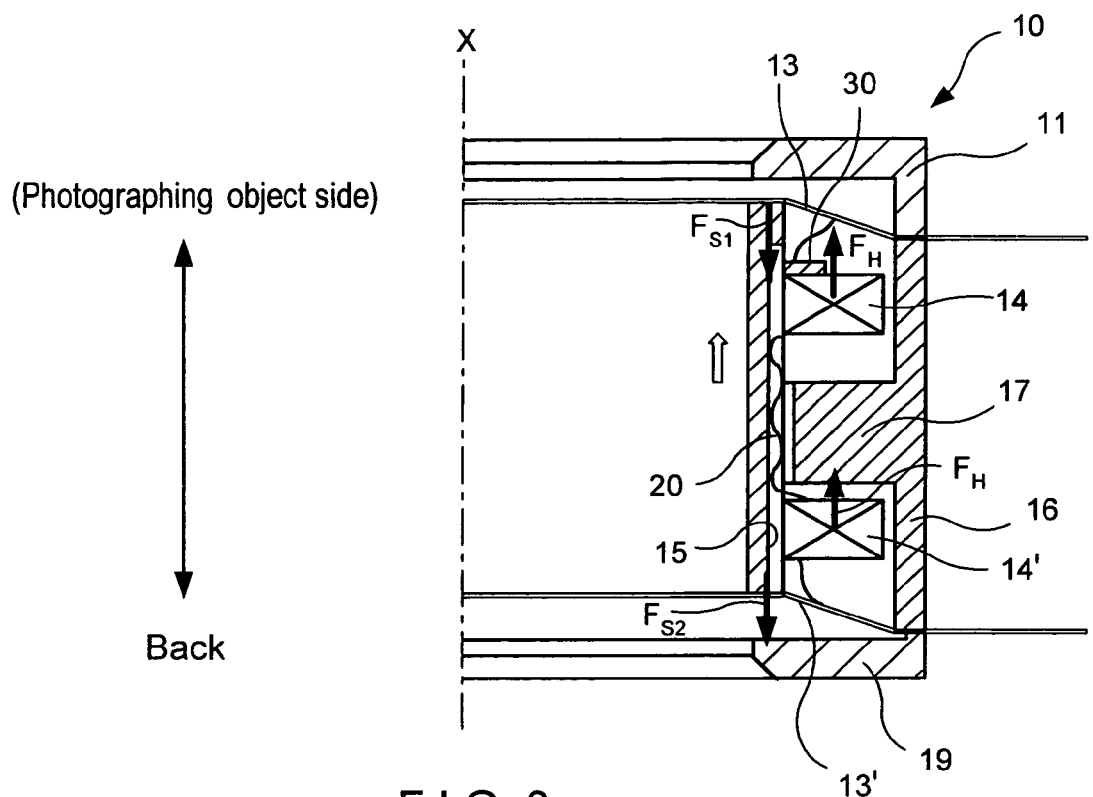
Figure 3F:
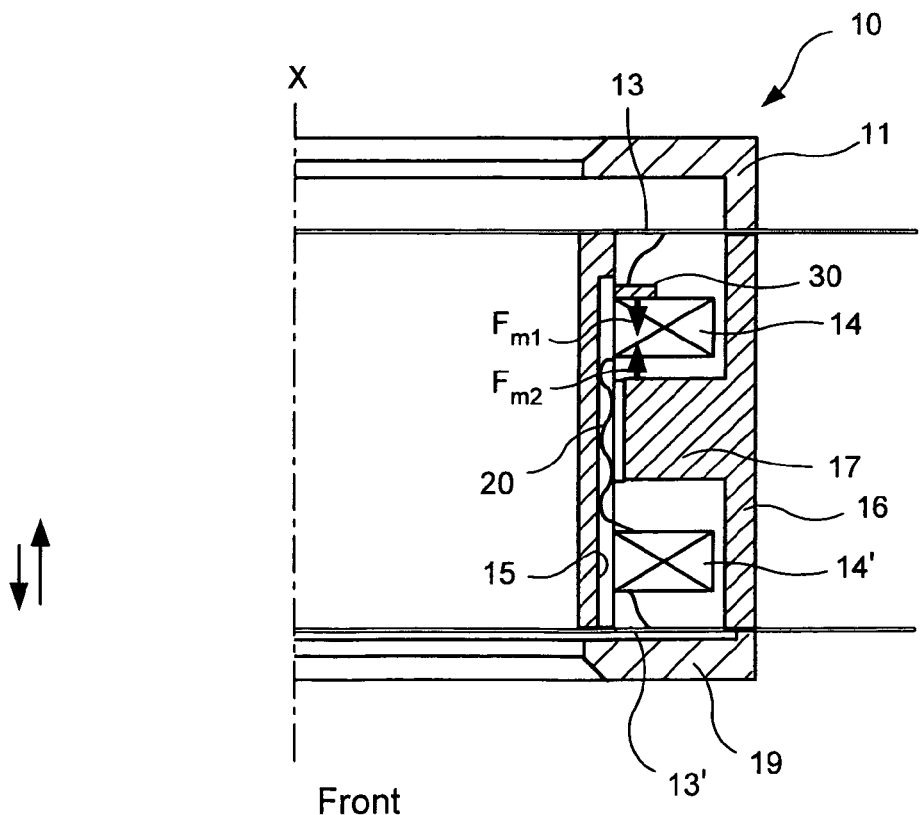

FIG. 1 is a across sectional drawing to illustrate the machine construction of lens drive unit 10 of the first mode of embodiment of the present invention. To be more specific, FIG. 1 (a) is a cross sectional drawing of lens drive unit 10 that is cut in the direction of optical axis X of the lens. FIG. 1 (b) is a plane cross sectional drawing when lens drive unit 10 as illustrated in the cross sectional drawing of FIG. 1 (a) is cut along A–A' alternate long and short dash line. Moreover, in FIG. 1 (a), for convenience of description the top is the front side close to the subject.

In FIG. 1, lens drive unit 10 is mainly composed of cover holder 1 corresponding to a part of the fixed body and sleeve 15 corresponding to a part of the moving lenticular body. Attached to the inside of sleeve 15 is roughly cylindrical lens barrel 12 wherein optical axis X is positioned in the center (Not shown in FIG. 1. See FIG. 2). The inside of lens barrel 12 is equipped with lens 12 a (See FIG. 2). Moreover, lens 12 a is generally composed of a combination of multiple lenses.

Cover holder 11 can be fitted in holder receiver 19 (See FIG. 2). Thus, fixed is cylindrical yoke 16. Ring-shaped magnet 17 is fastened to the inner periphery of this yoke 16. Namely, magnet 17 is fastened to yoke 16 so as to protrude to the inside from the inner periphery of yoke 16 (See FIG. 2), and magnetized in the direction perpendicular to the optical axis X direction. Moreover, yoke 16 is composed of a ferromagnetic material such as a steel plate or the like.

Ring-shaped first coil 14 is fastened to the front side of the outer periphery of sleeve 15, and ring-shaped second coil 14' is fastened to the rear side. Namely, in the outer periphery of sleeve 15, first coil 14 is arranged on the front side from magnet 17 so as to face this magnet 17, and second oil 14' is arranged so that magnet 17 is present in the direction of optical axis X due to the relationship with this first coil 14. As a result, the rear end of first coil 14 faces the front and of magnet 17, and the front end of second coil 14' faces the rear end of magnet 17. Moreover, first coil 14 and second coil 14' which are fastened to sleeve 15 are able to perform a relative displacement in the direction of optical axis X with respect to yoke 16.

The magnetic flux from the N pole of magnet 17 passes through sleeve 15, first coil 14 and yoke 16 to return to magnet 17 again. Moreover, the magnetic flux from the N pole of magnet 17 passes through sleeve 15, second coil 14' and yoke 16, for example, to return to magnet 17 again. Therefore, a magnetic circuit (magnetic path) is formed by the members comprising first coil 14, second coil 14', yoke 16 and sleeve 15. In this case, a magnetic material is preferably employed for the material of sleeve 15. Moreover, sleeve 15 can also be removed from the material that makes up the magnetic circuit (magnetic path).

The distance between the opposed surfaces of first coil 14 and second coil 14' is greater than the thickness of magnet 17 in the direction of optical axis X. There is a gap between magnet 17 and first coil 14 (or second coil 14'), and sleeve 15 integrated with first coil 14 and second coil 14' can be moved in the direction of optical axis X within the range of this gap. The length of yoke 16 in the direction of optical axis X is made greater than the distance between the opposed surfaces of first coil and second coil 14'. By doing so, the leakage flux leaked out from the magnetic path between magnet 17 and first coil 14 (or second coil 14') can be reduced, and the linearity between the movement amount of sleeve 15 and the current supplied to first coil 14 (and second coil 14') can be improved.

Installed in the center of the front side of cover holder 11 is circular entrance window 18 which is for taking in the reflected light from the subject to lens 12 a (See FIG. 2).

Lens drive unit 10 is provided with the flat spring 13 and flat spring 13' to control the movement of sleeve 15. Here, flat spring 13' is described in detail with reference to as shown in FIG. 1 (a). In FIG. 1 (b), flat spring 13' attached to holder receiver 19 is engaged with antirotation groove 19a, thereby preventing flat spring 13' from rotating.

Flat spring 13' is a metal-made spring to supply a current, and the rear end of sleeve 15 is mounted to innermost circumferential part 13' a. In addition, terminal 13' b for energizing second coil 14' is formed in three places in circumferential part 13' a (See FIG. 1 (b)) and a current can be supplied to second coil 14' via terminal 13' b.

Moreover, while the detailed description is omitted here, a terminal for energizing first coil 14 is also formed in flat spring 13 in the same way as flat spring 13, and a current can be supplied to first coil 14 through its terminal. Thus, flat spring 13 and flat spring 13' can be allowed to function as the wiring for energizing first coil 14 and second coil 14'. By extension, the circuit construction (circuit wiring) of lens drive unit 10 can be made easy, and miniaturization of whole lens drive unit can be undertaken.

In the present embodiment, wiring 20 for energizing first coil 14 and second coil 14' is installed in sleeve 15 (See FIG. 1 (a)) thereby enabling the current supplied to first coil 14 to become equal to the current supplied to second coil 14', and controlling the current becomes easy.

By the use of lens drive unit composed of such a construction, the elastic force due to flat spring 13 and flat spring 13' can be utilized to stop sleeve 15 (to which first coil 14 and second coil 14' are fastened) at a desired position. This stopping operation is described in detail in "stopping operation" that is described later.

Now, as shown in FIG. 1 (a), in the lens drive unit 10, circular magnetic member 30 is arranged on the opposite side of magnet 17 sandwiching first coil 14 between circular magnetic member 30 and magnet 17. Moreover, magnetic component 30 is arranged along the same axis as the optical axis X. This enables sleeve 15 to be held by the magnetic attraction acting between magnetic member 30 and magnet 17. This holding operation is described in detail in the in the [Holding Operation] section described later. Next, a method for assembling lens drive unit 10 is described.

FIG. 2 is a disassembled three-dimensional view for explaining the assembly method for the lens drive unit of the present invention. The same assembly method can also be adopted for lens drive unit 10 A of another embodiment of the present invention which is described later. Moreover, first coil 14 and second coil 14' should be fastened to the outside of sleeve 15 in advance and, at the same, lens barrel 12 having lens 12 a should be preinstalled inside sleeve 15. In addition, magnet 17 should be fastened in advance to the inner periphery of yoke 16. Moreover, a crevice is present in the direction of optical axis X in magnet 17 and yoke 16, and they become dividable into two pieces.

In FIG. 2, first, flat spring 13' is attached to holder receiver 19 so as to be engaged with antirotation groove 19 a formed in holder receiver 19. Then, circular magnetic member 30 can be fastened to the upper edge (or top) of first coil 14. At this stage, magnetic member 30 may be fastened to the upper edge sleeve 15. Next, magnet 17 and yoke 16 are divided into two pieces, and magnet 17 and yoke 16 are integrated (fastening) again so that magnet 17 is present between second coil 14' and first coil 14 fastened to the outer periphery of sleeve 15. Then yoke 16 inside which sleeve 15 is incorporated is fastened to holder receiver 19. At this time, the rear end of sleeve 15 is mounted to the innermost side of circumferential part 13' of flat sprint 13' a. Finally, flat spring 13 is mounted so that its innermost circumferential part abuts on the front end of sleeve 15. Thereafter, cover holder 11 is engaged with holder receiver 19. Thus, lens drive unit 10 as shown in FIG. 1 (a) can be assembled. Moreover, in flat spring 13 and flat spring 13', a tongue is formed on the outside in the radial direction; this becomes the feeding part to the coil.

FIG. 3 is a drawing to describe the state of holding sleeve 15 at a desired position in lens drive unit 10. FIG. 3 (a) and FIG. 3 (b) shows the machine construction when the right half is viewed from optical axis X in FIG. 1 (a). Magnet 17 is magnetized so that the inward radial direction becomes the N pole and the outward radial direction becomes the S pole.

In FIG. 3 (a), the magnetic flux from the N pole of magnet 17 passes through in the sequence of sleeve 15→first coil 14→yoke 15 (See arrows of FIG. 3 (b)). On the other hand, the magnetic flux from the N pole of magnet 17 passes through in the sequence of sleeve 15→second coil 14'→yoke 16. In such a state, a current of the same direction is supplied to first coil 14 and second coil 14'. In the present embodiment mode, as shown in FIG. 3 (c), a current is supplied "frontward" from the "back" of the paper. Then, each of first coil 14 and second coil 14' which are placed in a magnetic field and are under energization is subjected to upward (front side) magnetic force FH (See arrows of FIG. 3 (c)). Therefore, a magnetic circuit (magnetic path) is formed by the members comprising first coil 14, second coil 14', yoke 16 and sleeve 15. Thus, sleeve 15 fastened to first coil 14 and second coil 14' begins to move forward.

Moreover, in the present embodiment mode, as mentioned above, wiring 20 for energization is installed in sleeve 15 and the current supplied to first coil 14 is made equal to the current supplied to second coil 14'. As a result, approximately equal electromotive force FH is applied to first coil 14 and second coil 14'. Moreover, since the size of lens drive unit 10 is very small (for instance, outer diameter about 10 mm×height about 5 mm), the magnetic flux passing through first coil 14 is considered roughly equal to the magnetic flux passing through second coil 14'.

At this time, a force to control the movement of sleeve 15 (elastic force FS1, elastic force FS2) is generated between flat spring 13 and the front end of sleeve 15, and between flat spring 13' and the rear end of sleeve 15 (See arrows of FIG. 3 (d)). Therefore, when electromagnetic fore FH+FH to move sleeve 15 forward and elastic force FS1+FS2 to control the movement of sleeve 15 are in balance, sleeve 15 stops. Thus, sleeve 15 can be stopped at a desired position by adjusting the current amount to be supplied to first coil 14 and second coil 14' and elastic force applied on sleeve 15 by first spring 13 and flat spring 13'.

Furthermore, in the present embodiment mode, since flat spring 13 and flat spring 13' in which a linear relationship between the elastic force (stress) and displacement amount (strain) is established are used, the linearity between the movement amount of sleeve 15 and the current supplied to first coil 14 and second coil 14' can be improved. Moreover, since two elastic members comprising flat spring 13 and flat spring 13' are used, when sleeve 15 stops a great force of balance is applied in the optical axis X direction and, even if other forces such as a centrifugal force and the like are applied in the optical axis X direction, sleeve 15 can be stopped more stably. Furthermore, in lens drive unit 10, stoppage of sleeve 15 is not done by collision with a collision material (cushioning material); it is done by utilizing the balance between the electromagnetic force and elastic force. Hence generation of the collision sound can also be prevented.

When the mode switches from macro photographing to the normal photographing (when the camera is not in use), lens drive unit 10 moves from the state shown in FIG. 3 (a) to the state shown in FIG. 3 (b). More concretely, when a current does not flow to first coil 14 and second coil 14', the previously described electromagnetic force FH does not act on first coil 14 and second coil 14', so sleeve 15 returns to the original position due to the elastic forces FS1 and FS2 of flat spring 13 and flat spring 13' respectively.

At this time, sleeve 15 is held by the magnetic forces Fm1 and Fm2 acting between magnetic member 30 and magnet 17 through first coil 14. This prevents sleeve 15 from shaking and loosening. What is more, it suppresses variations of stationary position accuracy of lens 12a, lens barrel 12, and the like during normal photographing (when the camera is not in use).

Particularly, according to lens drive unit 10 associated with this embodiment, since magnetic member 30 has a circular shape and is arranged along the same axis as the optical axis X, magnetic attractions caused between magnetic member 30 and magnet 17 do not vary; as a result, magnetic attractions can be generated stably at all points in the circumferential direction of first coil 14. Therefore, the stationary position accuracy of the moving lenticular body of lens 12a, lens barrel 12, and the like can be better stabilized. In addition, the thickness of magnetic member 30 in the direction of the optical-axis X can be changed to various thicknesses in order to adjust the magnitude of magnetic attraction.

Moreover, in lens drive unit 10 associated with this embodiment, the outer diameter of magnetic component 30 is about the middle value between the inner diameter and the outer diameter of first coil 14 (See FIG. 1 or 2). In this way, the radial magnetic attraction between magnetic component 30 and a yoke 16 can be reduced, and what is more, it prevents the moving lenticular body such as lens 12a or lens barrel 12 from becoming off-centered from the optical axis X. In addition, in view of this, it can be said that it is desirable that the outer diameter of magnetic member 30 is smaller than the middle value mentioned above.

Figure 4:
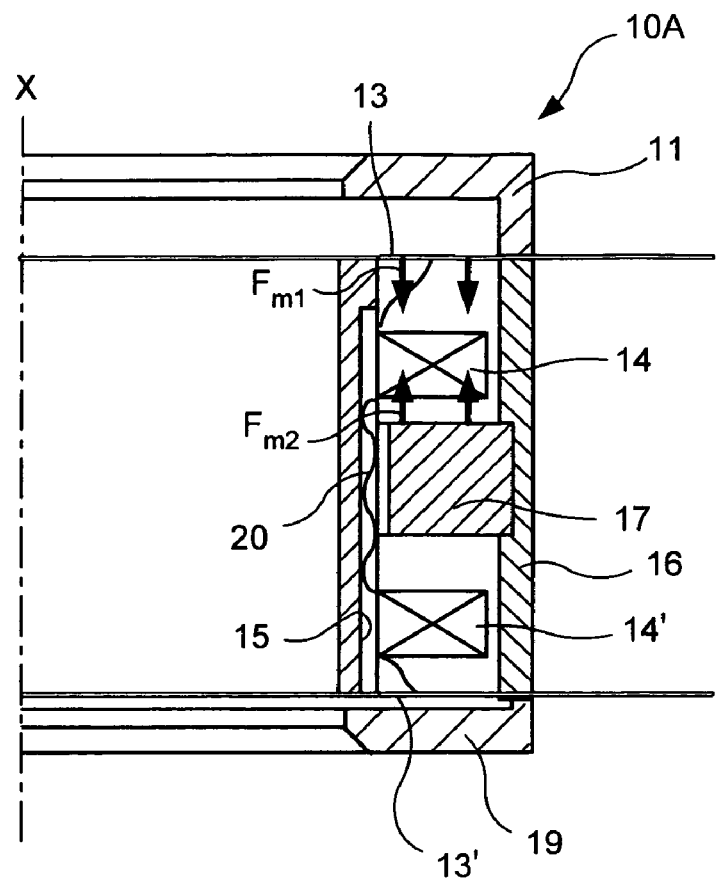
FIG. 4 illustrates an outline of an alternative lens drive unit of another embodiment of the present invention.

FIG. 4 is a drawing to illustrate an outline of the machine construction of lens drive unit 10 A of another embodiment mode of the present invention.

In FIG. 4, unlike lens drive unit 10 shown in FIG. 3 (b), in lens drive unit 10A, the magnetic component 30 is eliminated, and flat spring 13 is used as the magnetic member magnetically attracted to magnet 17. In this way, sleeve 15 is held by the magnetic attractions Fm1 and Fm2 that act between flat spring 13 and magnet 17 through first coil 14.

Thus, lens drive unit 10A can prevent sleeve 15 from shaking and loosening, and what is more, it can suppress variations in the stationary position accuracy of lens 12a, lens barrel 12, and the like during normal photographing (when the camera is not in use).

In addition, as described above, in view of the fact that flat spring 13 works as a terminal such that a current is supplied to first coil, it is desirable that its material is, for example, stainless steel of the copper type or phosphorous type.

Figure 5:
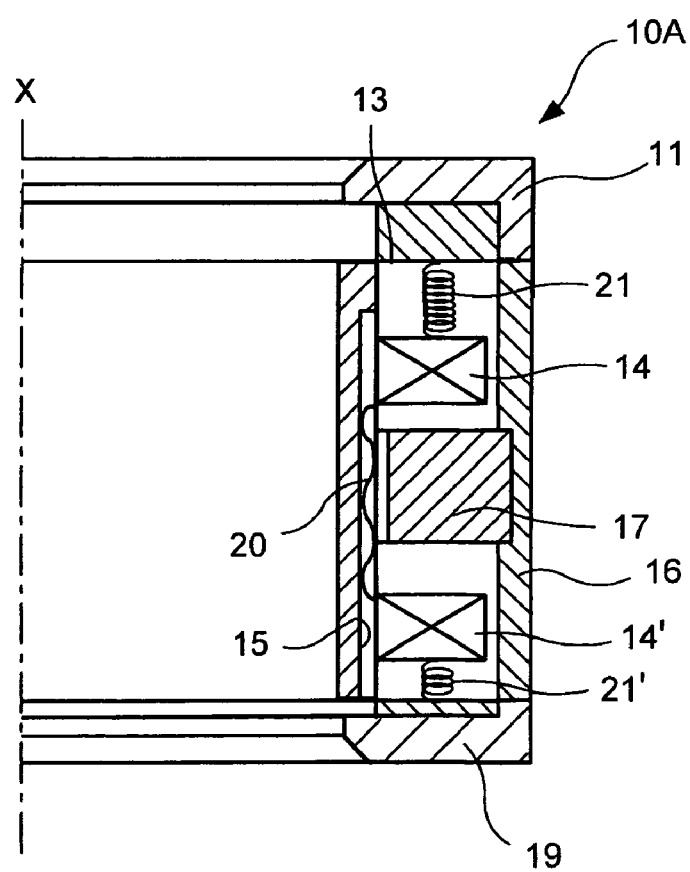
FIG. 5 shows an outline of the lens drive unit of the another embodiment of the present invention.

FIG. 5 is a drawing to illustrate an outline of lens drive unit 10 A of one embodiment of the present invention.

In FIG. 5, lens drive unit 10 A adopts coil spring 21 and coil spring 21', which is shorter than coil spring 21, to control the movement of sleeve 15. Thus even when flat spring 13 and flat spring 13' in lens drive unit 10 adjustment of the current amount supplied to first coil 14 and second coil 14' can generate an appropriate elastic force to control and stop lens 12 a attached to sleeve 15 at a desired position. Moreover, it is also possible to use coil spring 21 and coil spring 21' for the wiring for energization. Moreover, although the length of coil spring 21' is made shorter than that of coil spring 21 in the present embodiment mode, it is because of the fact that the standard position of sleeve 15 is on the rear side. For instance, when the standard position of sleeve 15 is on the front side, coil spring 21 becomes shorter. Naturally, when the standard position of sleeve 15 is at the center both have the length.

Figure 6A:
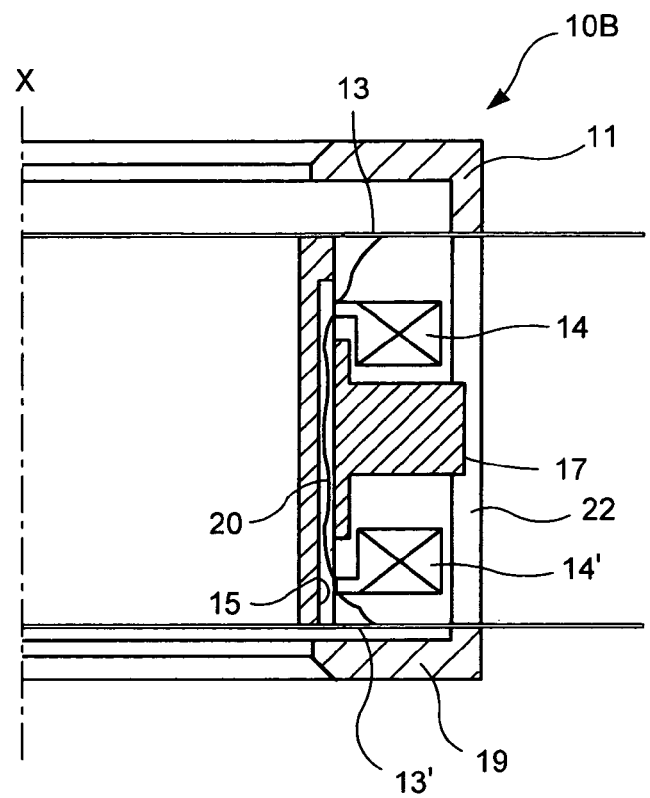
FIG. 6 is illustrates an outline of the lens drive unit of a third embodiment of the present invention.
Figure 6B:
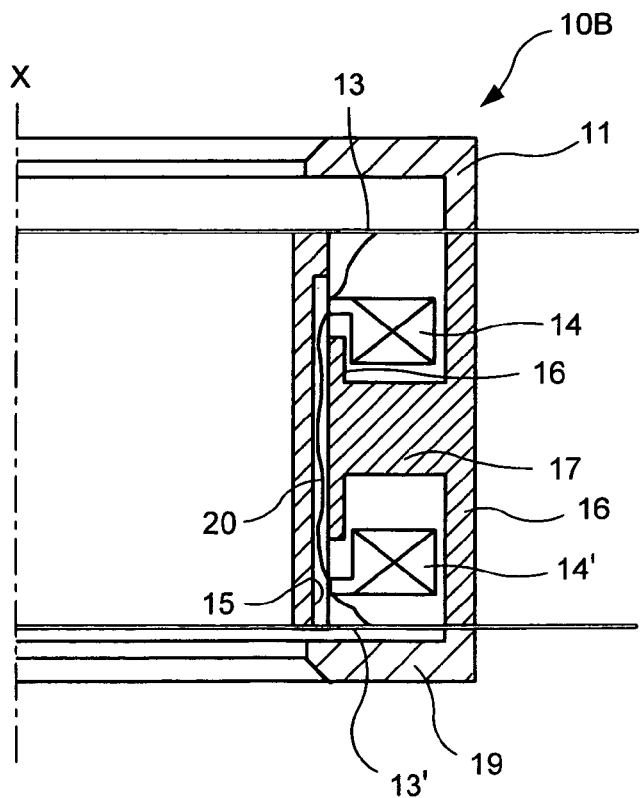

FIG. 6 is a drawing to illustrate an outline of the machine construction of lens drive unit 10 B of yet another embodiment of the present invention.

In FIG. 6 (a), for lens drive unit 10 B, cylindrical case 22 is fixed with cover holder 11 and holder receiver 19. Magnet 17 is fastened so as to protrude inward from the inner periphery of this case 22 and, at the time, yoke 16 is fastened to this magnet 17. Thus the position of yoke 16 may be arranged inward in the radial direction from first coil 14 and second coil 14'. As shown in FIG. 6 (b), case 22 may be replaced with yoke 16 and yoke 16 may be arranged on both the outside in the radial direction and the inside in the radial direction with respect to first coil 14 and second coil 14'. By doing so, the leakage flux leaked out from the magnetic path between first coil 14 and second coil 14' can be reduced, and the linearity between the movement amount of sleeve 15 and the current supplied to first coil 14 and second coil 14' can be improved.

Moreover, in FIG. 6 (b), the length of yoke 16 (fastened to the N pole of magnet 17) in the inside in the radial direction becomes shorter than that of yoke 16 (fastened to the S pole of magnet 17) on the outside in the radial direction. The present invention, however, is not limited to this; for instance, the length of yoke 16 (fastened to the N pole of magnet 17) in the inside in the radial direction may be made longer. Naturally, they may also have the length. However, as mentioned above, if the leakage flux is taken into consideration, it is desirable that they be formed so as to be at least longer than the distance between the opposed surfaces of first coil 14 and second coil 14'.

Furthermore, in lens drive units 10, both magnet 17 and yoke 16 are installed in either one of the moving lenticular body such as sleeve 15 or the like and the fixed body such as cover holder 11 or the like. Consequently, even if the moving lenticular body undergoes relative displacement with respect to the fixed body, the relative position relationship between magnet 17 and yoke 16 remains unchanged, and the adverse influence caused by an attraction applied between magnet 17 and yoke 16 can be prevented.

On the other hand, the present invention is not limited only to the case that the relative position relationship between magnet 17 and yoke 16 is non-changing. For example, it is also possible to consider lens drive unit 10 C shown in FIG. 6.

Figure 7A:
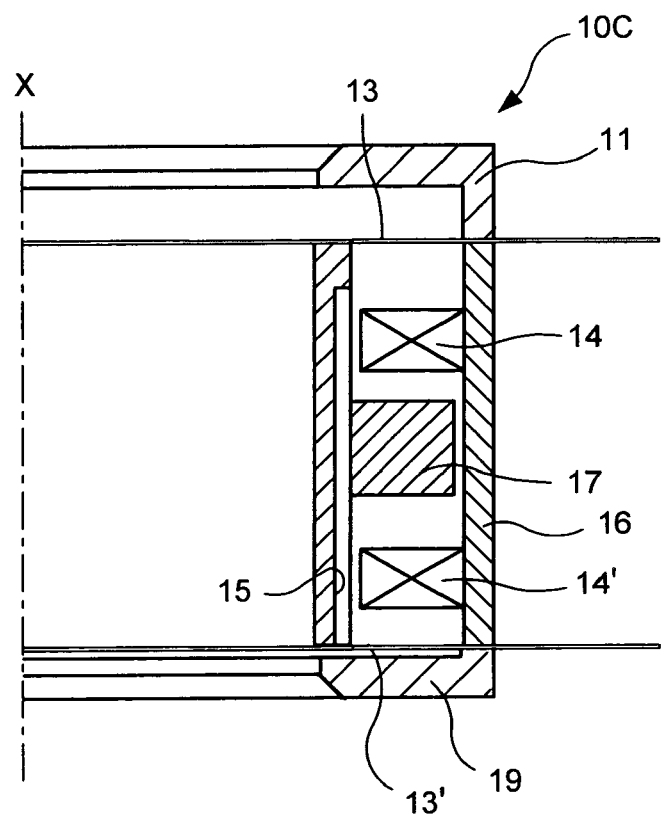
FIG. 7 shows an outline of the lens drive unit of a fourth embodiment of the present invention.
Figure 7B:
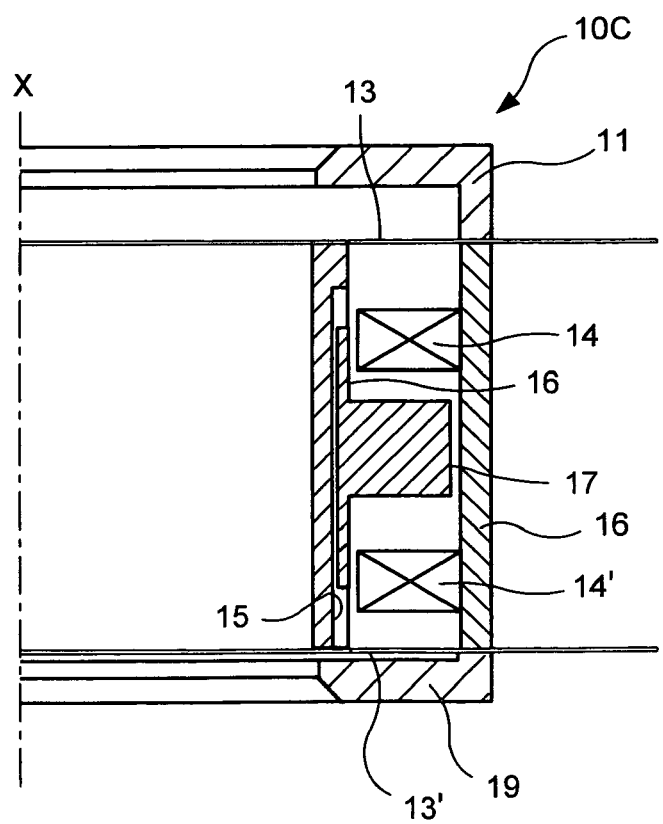

FIG. 7 is a drawing to illustrate an outline of the machine construction of lens drive unit 10 of the fourth embodiment mode of the present invention.

In FIG. 7 (a), magnet 17 is fastened to sleeve 15 and, at the time, first coil 14 and second coil 14' are fastened to yoke 16 which is fixed with cover holder 11 and holder receiver 19. As mentioned above, if the moving lenticular body to which magnet 17 is fastened moves in the optical axis direction X with respect to the fixed body to which yoke 16 is fastened, it is subjected to the adverse influence caused by attractions in the radial direction which is applied between magnet 17 and yoke 16. On the other hand, since first coil 14 and second coil 14' are fastened to the fixed body instead of the moving lenticular body, there is an advantage that the wiring for energization does not become complicated. Additionally, in FIG. 6 (a), although yoke 16 is installed only on the outside in the radial direction with respect to first coil 14 and second coil 14', naturally it may also be arranged on both the outside in the radial direction and the inside in the radial direction (See FIG. 7 (b)). Moreover, as first coil 14 and second coil 14' are fastened to yoke 16 in lens drive unit 10 C, a force of reaction to the electromagnetic force applied to first coil 14 and second coil 14' acts on sleeve 15 and can move sleeve 15 in the optical axis X direction.

Lens drive units 10 as described above can be attached to various electronic instruments in addition to camera-attached cell phones. For instance, they are PHS, PDA, bar code readers, thin digital cameras, monitor cameras, cameras for confirming the rear side, doors having an optical certification function and the like.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims.

The invention claimed is:

1. A lens drive unit comprising:
   a moving lenticular body equipped with a lens;
   a driving mechanism to move said moving lenticular body in the optical axis direction of the lens; and
   a fixed body that supports said moving lenticular body so as to make it movable in the optical axis direction of the lens;
   wherein:
   said driving mechanism is provided with a magnet magnetized in the direction perpendicular to the optical axis direction of the lens, and multiple coils arranged so that at least one coil of said multiple coils is arranged on one side in the optical axis direction with respect to said magnet and at least another one coil of said multiple coils is arranged on the other side in the optical axis direction with respect to said magnet, and said magnet is relatively moved so as to move towards and away from said one coil or said another one coil in the optical axis direction;
   either one of said magnet and said multiple coils is installed in said moving lenticular body, and the other in said fixed body; and said driving mechanism is provided with a controlling means to control the movement of said moving lenticular body caused by the electromagnetic force when a current is supplied to said multiple coils to generate said electromagnetic force.

2. The lens drive unit as described in claim 1, wherein said controlling means is an elastic member energizing said moving lenticular body in the optical axis direction of the lens.

3. The lens drive unit as described in claim 2, wherein said elastic member comprises a first elastic member energizing said moving lenticular body in one direction of the optical axis directions of the lens, and a second elastic member energizing in the direction opposite to said one direction.

4. The lens drive unit as described in claim 3, wherein said first elastic member and said second elastic member are metal-made elastic members which allow said multiple coils to be energized.

5. The lens drive unit as described in claim 1, wherein said lens drive unit is further equipped with a yoke which changes the direction of the magnetic flux from said magnet; and said yoke is formed in such a manner that its length in the optical axis direction of the lens becomes greater than the distance between two opposed surfaces of said multiple coils and, it is installed in said moving lenticular body and/or said fixed body.

6. The lens drive unit as described in claim 5, wherein said magnet and said yoke are installed either in said moving lenticular body or in said fixed body.

7. A lens drive unit comprising:
   a moving lenticular body equipped with a lens;
   a driving mechanism to move said moving lenticular body in an optical axis direction of the lens; and
   a fixed body that supports said moving lenticular body so as to make it movable in the optical axis direction of the lens;
   wherein said driving mechanism is provided with a magnet and multiple coils arranged so that at least one coil of said multiple coils is arranged on one side in the optical axis direction with respect to said magnet and at least another one coil of said multiple coils is arranged on the other side in the optical axis direction with respect to said magnet, and said magnet is relatively moved so as to move towards and away from said one coil or said another one coil in the optical axis direction, and either one of said magnet and said multiple coils is installed in said moving lenticular body, and the other in said fixed body;
   wherein said driving mechanism also comprises a controlling means to control the movement of said moving lenticular body caused by the electromagnetic force when a current is supplied to said multiple coils to generate said electromagnetic force, and a magnetic member arranged on the opposite side of said magnet so as to be attracted to said magnet and so as to sandwich one of said multiple coils between said magnetic member and said magnet.

8. The lens drive unit as set forth in claim 7, wherein said magnetic member is formed in a circular shape and arranged along the axis as the optical axis of said lens.

9. The lens drive unit as set forth in claim 7, wherein, said magnetic member is arranged on the opposite side of said magnet in such a manner that, among said multiple coils, the coil on the subject side is sandwiched between said magnetic member and said magnet.

10. A lens drive unit comprising:
    a moving lenticular body equipped with a lens;
    a driving mechanism to move said moving lenticular body in the optical axis direction of the lens; and
    a fixed body that supports said moving lenticular body so as to make it movable in the optical axis direction of the lens;
    wherein said driving mechanism is provided with a magnet and multiple coils arranged so that at least one coil of said multiple coils is arranged on one side in the optical axis direction with respect to said magnet and at least another one coil of said multiple coils is arranged on the other side in the optical axis direction with respect to said magnet, and said magnet is relatively moved so as to move towards and away from said one coil or said another one coil in the optical axis direction, and either one of said magnet and said multiple coils is installed in said moving lenticular body, and the other in said fixed body;
    wherein said driving mechanism is provided with a controlling means to control the movement of said moving lenticular body caused by the electromagnetic force when a current is supplied to said multiple coils to generate said electromagnetic force and, at the same time, said controlling means is a member to be magnetically attracted to said magnet.

11. The lens drive unit as set forth in claim 10, wherein said controlling means comprises a first elastic member to energize said moving lenticular body in one of the optical axis directions, a second elastic member to energize in the opposite direction of said first direction wherein either said first elastic member or said second elastic member is the member to be magnetically attracted to said magnet.

* * * * *